(12) United States Patent
Mathur et al.

(10) Patent No.: US 9,118,636 B2
(45) Date of Patent: Aug. 25, 2015

(54) DATA TRANSFER CONTROL SYSTEM AND METHOD

(75) Inventors: Sumit Mathur, Ealing (GB); Rab Mukraj, Scarsdale, NY (US); Darren Tome, Long Island City, NY (US)

(73) Assignee: NBCUniversal Media, LLC, Wilmington, DE (US)

( * ) Notice: Subject to any disclaimer, the term of this patent is extended or adjusted under 35 U.S.C. 154(b) by 1691 days.

(21) Appl. No.: 12/118,987

(22) Filed: May 12, 2008

(65) Prior Publication Data

US 2009/0282161 A1    Nov. 12, 2009

(51) Int. Cl.
| | |
|---|---|
| G06F 15/16 | (2006.01) |
| H04L 29/08 | (2006.01) |
| H04L 12/54 | (2013.01) |
| H04L 12/66 | (2006.01) |
| H04L 12/833 | (2013.01) |
| H04L 12/911 | (2013.01) |
| H04L 12/923 | (2013.01) |

(52) U.S. Cl.
CPC ............ *H04L 67/06* (2013.01); *H04L 12/5695* (2013.01); *H04L 12/66* (2013.01); *H04L 47/2458* (2013.01); *H04L 47/741* (2013.01); *H04L 47/745* (2013.01); *H04L 47/762* (2013.01); *H04L 67/1002* (2013.01); *H04L 67/325* (2013.01)

(58) Field of Classification Search
CPC ................................ H01L 67/06; H01L 12/66
USPC .......................................................... 709/232
See application file for complete search history.

(56) References Cited

U.S. PATENT DOCUMENTS

| | | | |
|---|---|---|---|
| 6,816,903 B1 * | 11/2004 | Rakoshitz et al. ............. | 709/226 |
| 6,868,087 B1 * | 3/2005 | Agarwala et al. ............. | 370/412 |
| 7,339,942 B2 * | 3/2008 | Morgan et al. ................ | 370/412 |
| 2008/0040501 A1 * | 2/2008 | Harrang et al. ............... | 709/232 |
| 2009/0089438 A1 * | 4/2009 | Agarwal et al. ............... | 709/228 |

* cited by examiner

*Primary Examiner* — Shripal Khajuria
*Assistant Examiner* — Farhad Ali
(74) *Attorney, Agent, or Firm* — Fletcher Yoder, P.C.

(57) ABSTRACT

Transfer of data files, such as large files for digital media, is performed through the intermediary of a gateway communication manager (GCM) that resides in an interface zone between external clients and an internal network. The external clients are registered with the GCM and request transfer of data files to the internal network. The GCM identifies a transfer agent to handle the transfer, and allocates a portion of shared bandwidth. If insufficient bandwidth is available or transfer agents are unavailable, the requested transfer may be placed in a queue and transfer occurs when bandwidth and agents can accommodate the request. The GCM may prioritize and re-prioritize transfers, such as based on the sender, content, and so forth. Multiple GCMs may manage transfers for external clients, and shared logs may be maintained to permit flexibility in management by the GCMs.

25 Claims, 5 Drawing Sheets

ACCESS REQUEST LOG — 54

CLIENT SYSTEM INFO:
- CLIENT SYSTEM NAME
- CLIENT SYSTEM IP ADDRESS
- CLIENT PHYSICAL ADDRESS
- CLIENT JOB ORGANIZATION

- CLIENT ACCESS BUS REQUIREMENTS
- DURATION
- ACCESS REQUIRED UNDER WHAT JOB ORGANIZATION
- CLIENT AUTHORIZED BUS. REQUIREMENT
- GRANT / REVOKE ACCESS

FIG. 5

SYSTEM REG. LOG — 52

- CLIENT SYSTEM NAME
- CLIENT SYSTEM IP ADDRESS
- CLIENT PHYSICAL ADDRESS
- CLIENT JOB ORGANIZATION

USER INFO:
- USER NAME
- USER ADDRESS
- USER PHONE

- CLIENT SYSTEM BW
- CLIENT LOCATION PREFERENCE
- CLIENT SYSTEM LOGIN INFO
- STATUS (A /P)
- EXTERNAL /INTERNAL USER
- INTERNAL RESPONSIBLE CONTACT

FIG. 4

DATA TRANSFER CONTROL SYSTEM AND METHOD

BACKGROUND

The invention relates generally to the transfer of large data files and the control of such transfer in view of available bandwidth and other considerations.

A wide range of systems and schemes have been developed for the transfer of data between organizations. In some of these, transmission is controlled by either the sender or the receiver or by an intermediary in a network between these parties. Problems addressed in this context include both security and appropriate utilization of available bandwidth. Bandwidth limitations may be encountered on both the sender side and a receiver side, as well as at various points therebetween, such as due to limitations of the network, network providers, and so forth. At present, however, many data and file transfer protocols do not adequately regulate transmission, and transmission failures or substantial reduction in transmission rates, even for high-priority transmissions, can occur.

Problems with bandwidth utilization for data and file transmissions are particularly acute when large volumes of data are transferred as compared to the available bandwidth. For example, in media companies, very large files may be transferred on a regular basis, such as from original providers (e.g., news reporters in the field, original content providers, and so forth) and from production and post-production suppliers. The files may include considerable video and audio data which may be extremely extensive, even in compressed formats. In certain environments, such as for news, timely broadcasts, and so forth, such large data files may need to be reliably transmitted on a daily or hourly basis, and throughout the day and night. When the transmissions are made over an internal network, problems with file transfer are more generally easily resolved. However, when files are transferred from external sources to an internal network, such as from content providers to a news organization, media company, or the like, the internal network may be inundated by received transmissions unless appropriate coordination is possible. Essentially, the outside transmitters of messages and large data files may operate on a "fire and forget" approach in which the messages are launched and, regardless of the ability of the internal network to receive and process the data, the transmissions are sent and queued at the destination.

Such problems may ultimately result in significant delays and even the loss of data. In particular, without appropriate coordination and with no effective prioritization, sent messages and files are processed as they are received. Thus, large, low-priority transmissions may saturate available bandwidth to a detriment of higher priority transmissions. Similarly, certain transmissions may be interrupted or aborted due to network transmission and receipt delays.

There is a need, therefore, for improved techniques for managing transfer and receipt of large data files.

BRIEF DESCRIPTION

The present invention provides novel techniques designed to respond to such needs. The invention may be implemented in a variety of settings, and is particularly well-suited for controlling the receipt of transmissions from external senders to an internal network. Applications of the techniques described herein may include any type of data or file transmission, and the techniques will be particularly useful for the transmission of large data files from sources that may send at the same time or at closely overlapping times. The techniques provide for coordination of receipt of such transmissions, and for monitoring and controlling receipt, and for forwarding of the transmissions to internal networks and clients. Particularly targeted applications may include the transmission of media and multi-media files, such as video, audio, audio/video, and similar large files.

In accordance for certain aspects of the invention, systems and methods are provided for transmitting data files includes an interface zone disposed between an external zone and an internal network. A gateway connection manager is operative in the interface zone for coordinating communications from external clients in the external zone to internal clients in the internal network. The gateway connection manager may cooperate with agents to transfer data files from the external clients to the internal clients under the direction of the gateway connection manager. More than one gateway connection manager may be included in the system, and sharing of logged data may be provided between such gateway connection managers. The sharing may take the form of a shared memory space or log. Data relating to the external clients, requested transmissions, specific parameters of requested and actual transmissions, and so forth may be kept by one or more of the gateway connection managers and in the shared log, where provided.

In accordance with other aspects, external clients may not be permitted to transfer data files until the gateway connection manager has authorized the transfer and arranged for utilization of available bandwidth, and established a transfer path (e.g., through a designated transfer agent). The gateway connection manager may also control and monitor use of bandwidth and transfer rates, and may queue requested transfers and reprioritize transfers in queues where desired.

In accordance with other aspects of the invention, other systems and methods of carrying out coordination of large data file transfer are provided.

DRAWINGS

These and other features, aspects, and advantages of the present invention will become better understood when the following detailed description is read with reference to the accompanying drawings in which like characters represent like parts throughout the drawings, wherein:

FIG. 4 is a diagram of an exemplary system registration log established by the logic of FIG. 3;

FIG. 5 is a diagram of an exemplary access request log established by the logic of FIG. 3;

DETAILED DESCRIPTION

Figure 1:
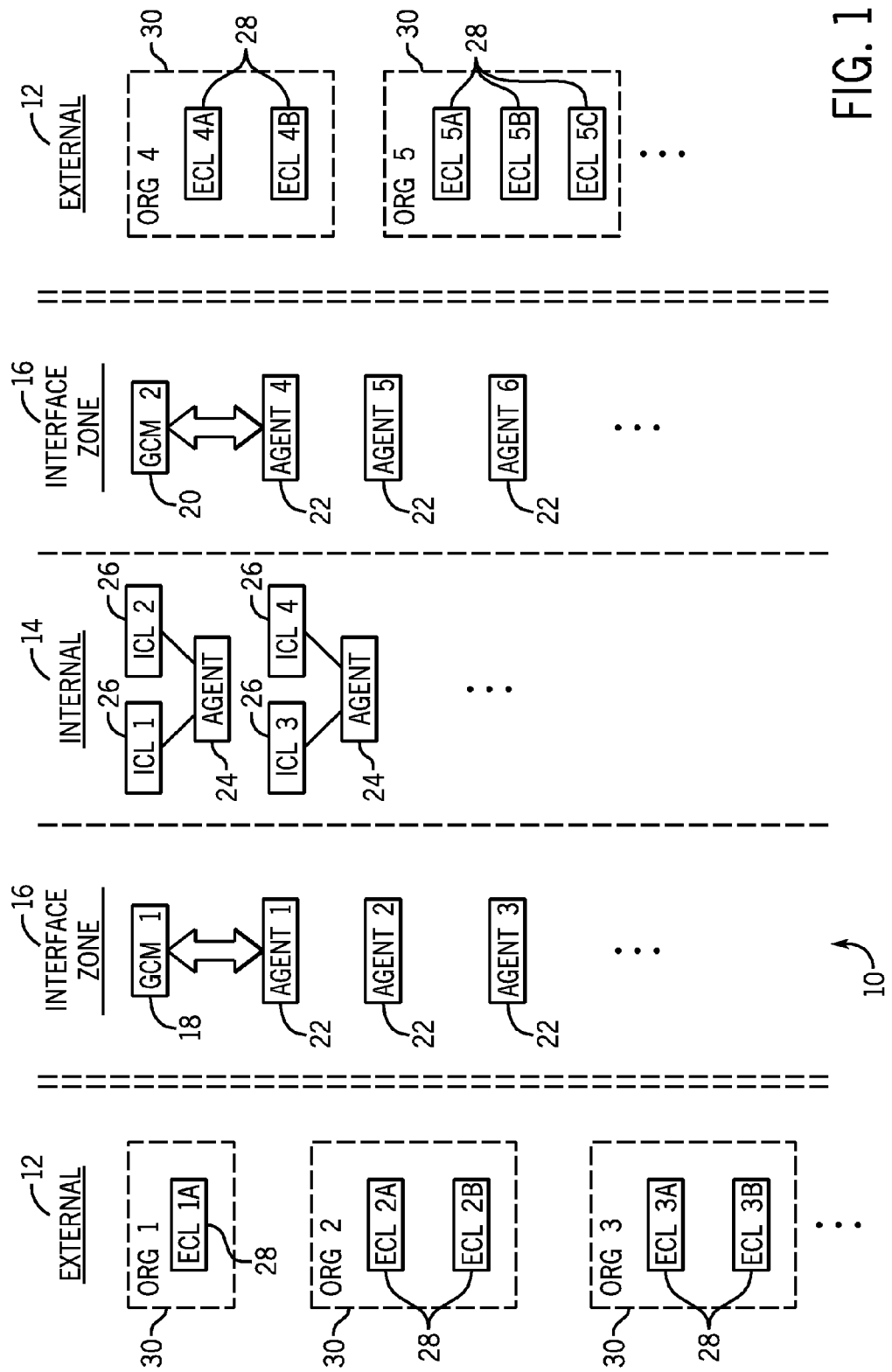
FIG. 1 is a diagrammatical overview of a file transfer system in accordance with aspects of the present technique.

Turning now to the drawings, and referring first to FIG. 1, a file transfer system 10 is illustrated diagrammatically. The system may be used for transmitting large amounts of data, typically in the form of data files between external sources and an internal network. While the system may also be used for transmitting data between the clients on the internal network, as well as from internal clients to the external clients, the particular control and coordination described herein focuses primarily on the transfers of large data files from external sources to internal clients.

In the illustration of FIG. 1, then, a number of external sources 12 provide data files that are transmitted to an internal network 14. One or more interface zones 16 are defined between the external sources and internal network. The interface zones 16 may comprise components that are local to the internal network or are partially or completely remote from the internal network. In a typical application, for example, the external sources 12 may be separated from the interface zones 16 by software and/or hardware firewalls so as to prevent unwanted communications between the external sources and the internal network. In a presently contemplated embodiment, for example, no direct communication takes place between the external sources and internal network, thereby protecting the internal network from security breaches, receipt of unwanted or unfiltered transmissions, and so forth.

The interface zones 16 are provided with gateway connection managers (GCMs), as indicated generally reference numerals 18 and 20. These gateway connection managers will typically include a server along with a human interface to provide for the control and coordination functions described more fully below. In a presently contemplated embodiment, multiple GCMs may be provided in different interface zones, such as geographically dispersed interface zones. More particularly, in the case of the United States, for example, east and west coast GCMs may be provided for receiving transmissions from external sources generally associated with those geographic delineations. However, as noted below, in accordance with aspects of the present technique transmissions may be received via any GCM, which can coordinate the receipt and transmission of the data files.

Also within each of the interface zones 16, agents 22 are provided to receive and retransmit data from the external sources to the internal network. Such agents may include servers running specialized software for the coordinated receipt of the data files and for retransmission to the internal network under the direction of the GCMs. The servers 22 may be manned or unmanned. The internal network 14, on the other hand, includes additional agents 24 designed to receive data files transmitted via the agents 22 of the interface zone. The agents 24 are linked to one another via the internal network, and may transmit data to and from internal clients as indicated by reference numerals 26. These internal clients, themselves, may be linked via one or more local area networks, and may be capable of transmitting and receiving data via any other suitable network, such as wide area networks. However, transmissions of data from the external sources illustrated in FIG. 1 are all coordinated through the GCMs operative in the interface zones.

The external sources 12 are collections of external clients 28 that are configured and authorized to communicate through the interface zones with the GCMs as described below. In exemplary applications, for example, the external clients may include media content providers, post-processing and post-production suppliers, and so forth. As will be appreciated by those skilled in the art, such clients may produce and need to transmit data files on a regular basis to internal networks within media companies, production companies, and so forth. In the presently contemplated embodiment illustrated in FIG. 1, the external clients are associated in organizations 30. This association may be used to identify and/or prioritize transmissions from the external clients and organizations to the internal clients via the interface zones as described below. For example, certain organizations known to have needs for transmitting very time-sensitive large data files may receive priority or favored transmission status, expanded or higher bandwidth, or other special treatment at the direction of the GCMs operative in the interface zones so as to permit internal clients to receive the data files in more timely, efficient, or special manners.

Figure 2:
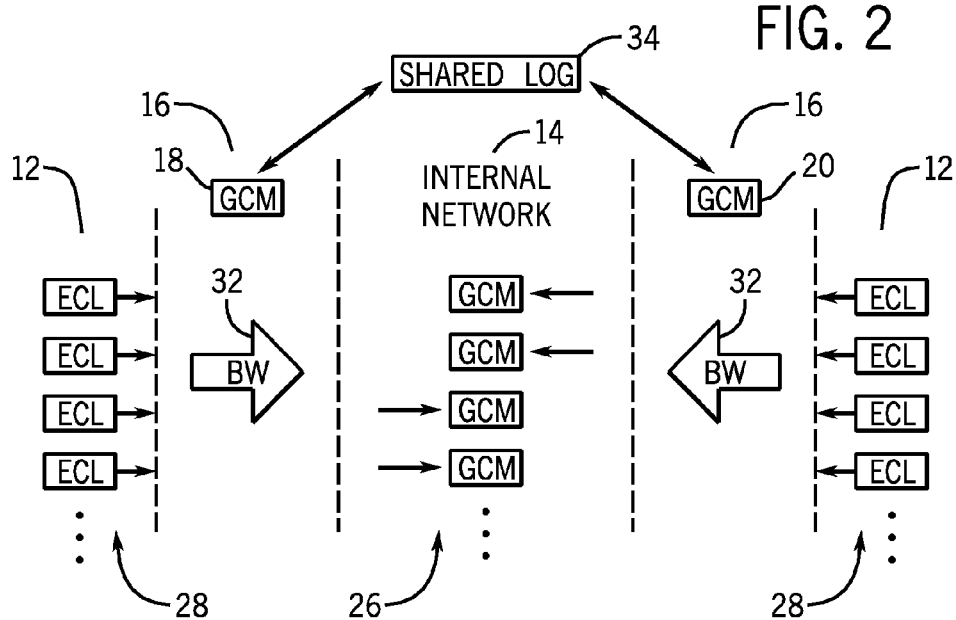
FIG. 2 is a similar diagrammatical view of the system of FIG. 1 illustrating sharing of log files between gateway connection managers.

As summarized below, the GCMs operate to qualify or register external clients for communication with the internal network through the interface zones, and also coordinate the allocation of bandwidth as well as the prioritization or re-prioritization of transmissions. Moreover, as illustrated in FIG. 2, the GCMs established records for all external clients, external client requests, and actual transmissions. As noted above with reference to FIG. 1, each GCM 18 and 20 will be operative in a respective interface zones 16 that isolates the external sources of data files from the internal network. In a typical application, the bandwidth as indicated by arrows 32 in FIG. 2 will be limited between the external clients and the internal network. By way of example, transmission through one of the interface zones may be limited to one gigabyte per second. Because a number of requests for transmission of large data files may be received on an on-going basis, this bandwidth may be allocated, or receipt traffic may be coordinated by the GCM to avoid overtaxing the available bandwidth, thereby insuring more reliable and timely receipt of the data files. The bandwidth within each zone 16 may vary greatly, but in all cases its usage is coordinated by the GCM in that zone. As also illustrated in FIG. 2, each GCM will collect information from the external clients and on transmissions requested and actually performed from the external clients and will log all such information either locally or in a shared log. In the embodiment illustrated of FIG. 2 a shared memory space 34 is employed for this purpose. As will be appreciated by those skilled in the art, in other contexts, each GCM may include its own separate log that is synchronized or updated from time-to-time so that each of the GCMs can refer to similar data. Such logs may allow for the prioritization of transmissions from certain external clients, the re-prioritization of queued transmissions when higher priority transmissions are requested, the directing of certain transmissions through particular target pathways, the monitoring of transmissions (e.g., to revoke permissions for certain external clients if need be), and so forth.

Figure 3:
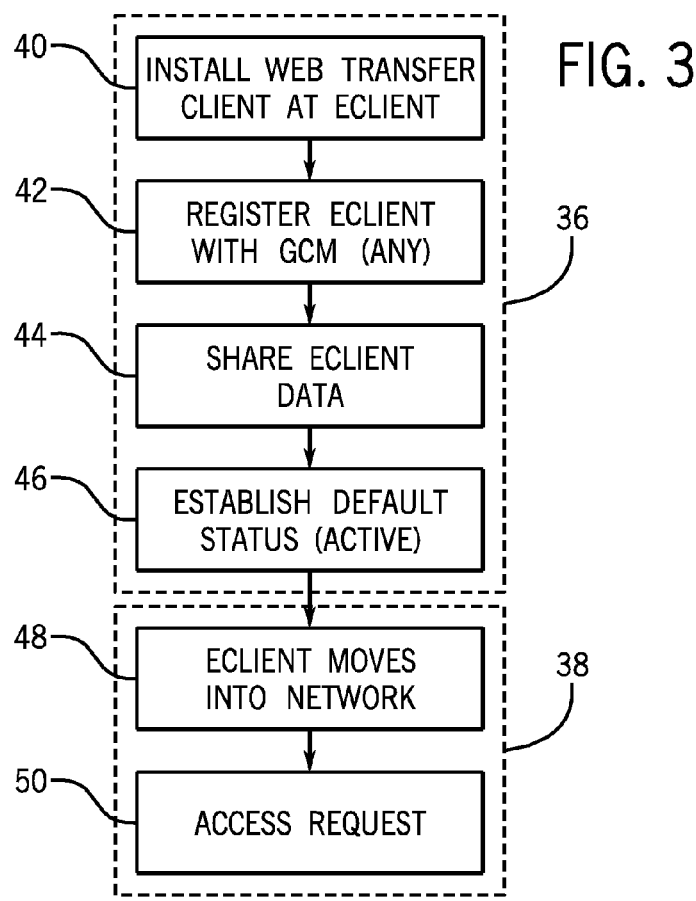
FIG. 3 is a flow chart illustrating exemplary logic for registering external clients and for permitting access to an internal network by such clients.

The process of coordination of transmission from external clients 28 to internal clients 26 on the internal network begins with registration of the external clients as indicated generally in FIG. 3. FIG. 3 represents exemplary logic in two different phases of external client registration and access, including a registration phase 36 and an optional internal access phase 38. In general, the registration phase 36 begins with the installation of web transfer client software at each of the external clients. This step, designated by reference numeral 40 in FIG. 3, will include loading of special software at each of the external client stations. The software will typically be loaded on an individual workstation or general purpose computer or server. Such software may include digital media distribution management software, available commercially from Signiant, Inc. of Burlington, Mass., although any suitable transfer software may be utilized.

With the web transfer client software loaded, each external client must register with a GCM. This step, as designated by reference numeral 42, will typically include an initial log-in procedure in which a number of elements of information are entered by a user and submitted to the GCM for logging. In a presently contemplated embodiment, the external client may register with any GCM, although in certain embodiments specific GCMs may be required to be used by particular external clients (such as on the basis of geographic location). As illustrated in step 44, the external client data is ultimately shared, such as by synchronization of logs at each of the GCMs or by entry into a shared log as illustrated in FIG. 2. The sharing of the information allows for the external client to subsequently transfer data via any of the GCMs based upon the registration performed only one of the GCMs. As indicated at step 46, a default status is established following the registration procedure, with an "active" default status being the presently contemplated implementation. In this status, then, the external client may contact the GCM and request transmission of data files to the internal network via the interface zone at any time.

FIG. 4 illustrates exemplary information which may be included in a system registration log of the type established by the registration phase 36 of FIG. 3. The system registration log 52 may collect any useful information that will be employed later for identification of the external client, selection of a transfer pathway for transmissions from the external client, prioritization of transmissions, where appropriate, and so forth. In the illustrated embodiment, for example, the system registration log includes the client system name, the client system IP address, and the client physical address. Where appropriate, the client system IP address can be updated where this address changes over time. In the presently contemplated embodiment, the client job organization is also part of the registration log, and corresponds generally to the organizations 30 illustrated diagrammatically in FIG. 1. Again, such organizational information may serve to determine a priority level for transmissions from certain external clients. The log 52 may also include client system user information, such as user name, user address and user telephone number. The log may also include client system bandwidth information that is used to set bandwidths for later data file transmissions. The client system location preference may be included in the registration log, and may be used to determine a default GCM through which transmissions may occur. As noted above, such locations may correspond, for example, to the east or west coast of the United States, although any other location preferences may be envisaged. Client system log-in information may also be included in the registration log, and will typically include some sort of authentication coding, such as user name and password fields. A status field may also be included, such as to indicate whether the status of the system is active or passive. In certain embodiments, for example, active external clients only may request and be authorized to transmit data files through the interface zone. The registration log may also include information relating to whether a client is an external or internal user. It will be noted that, while the present discussion relates to transmissions from external clients, essentially the same registration information and the process could be used for registering and qualifying internal clients. Finally, an internal network responsible contact may be recorded, such as a person or department that is responsible for or that requires transmission from the external clients being registered.

Returning to FIG. 3, at times it may be desirable for an external client to be present at or otherwise operate on the internal network. The access phase 38 accommodates such typically transitory situations. As indicated at step 48, then, the external client may move into the internal network. An access request is then completed as indicated at step 50 and access to the internal network may be permitted at least on a temporary basis. Such access to the internal network will allow the external client to function as an internal client during the access period. FIG. 5 illustrates an exemplary access request log in a presently contemplated embodiment that may be kept for such temporary access. In the illustrated embodiment, this log includes the client system name, IP address, physical address and job organization. The log may further more include such data as the client access business requirements, the duration for the internal access, an indication of the job organization under which the access is required, the client authorized business requirement, and a field indicating whether access is granted or has been revoked. Based upon this request log, then, the system may permit the external client to function as an internal client during a limited period or so long as the internal access has been granted and has not been revoked.

Figure 6:
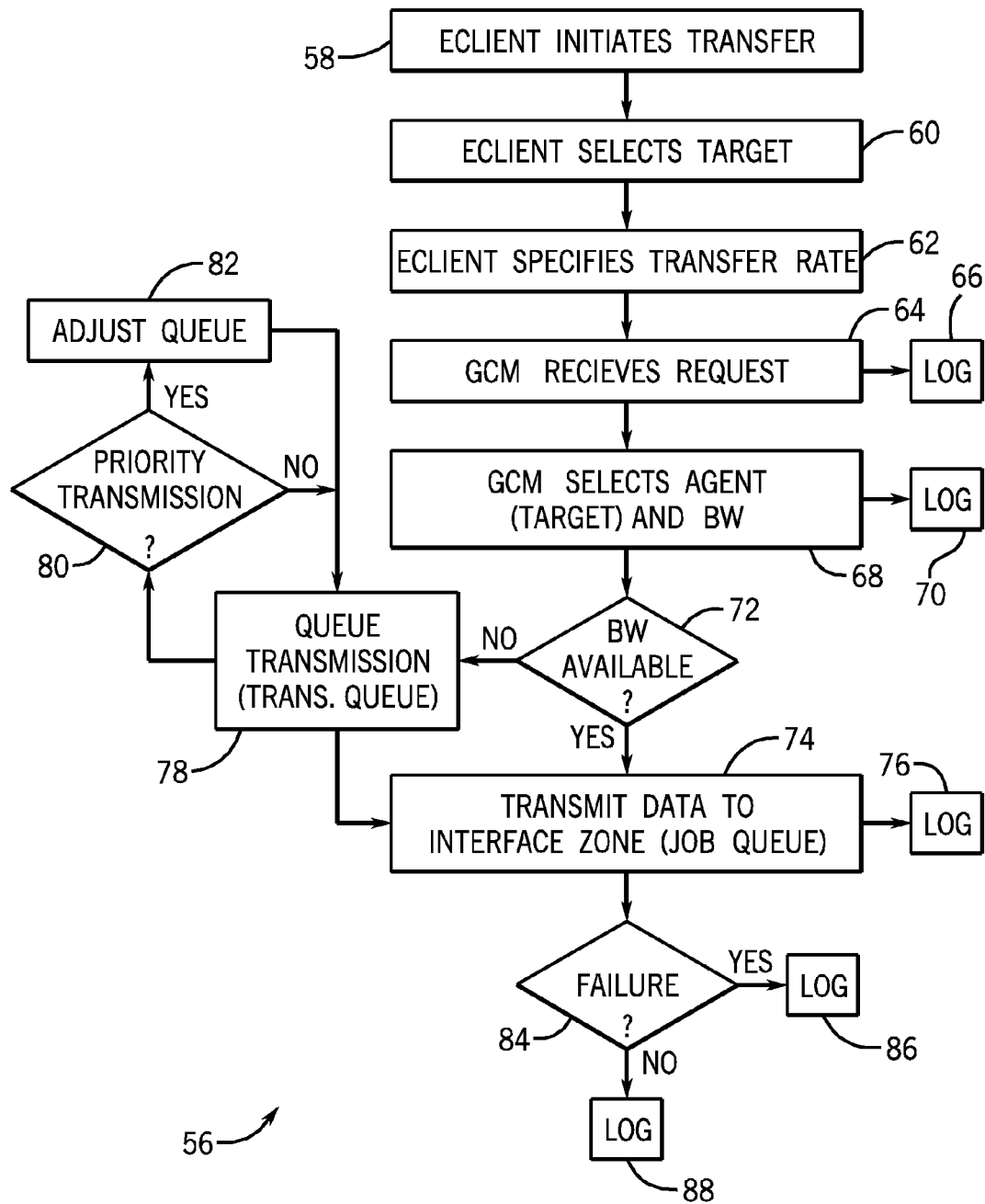
FIG. 6 is a flow chart illustrating exemplary logic for the transmission of data files in accordance with the present techniques via the systems illustrated in FIGS. 1 and 2.

Once the external clients have been registered and are qualified to request the transfer of data files through the interface zone to internal clients, various procedures may be established to facilitate such transfer. FIG. 6 illustrates exemplary logic in a transfer process designated generally by reference numeral 56. In a presently contemplated embodiment, transfers begin when initiated by external clients as indicated by step 58. The external client initiates the transfer by contacting the GCM via the web transfer client software loaded on the external client. The external client may then select the target destination as indicated by step 60. As noted above, multiple GCMs may exist in the system, and the external client may be directed through a particular GCM and interface zone, such as by referenced to the client profile shared between the GCMs. It may be preferred, in certain applications that the external clients may be restricted to one or a subset of GCMs depending upon such factors as their geographical location, existing relationships, past, transmissions, and so forth. The client may also, then, specify a data transfer rate as indicated by step 62.

Once the data transfer request has been formulated, it is transmitted to the GCM as indicated at step 64. The GCMs log all such received requests as indicated at step 66. The GCM then selects a transfer agent and may select a target pathway as well as a bandwidth for the transmission, as indicated at step 68. For example, in a presently contemplated embodiment, the GCM determines which agent is currently available or will be available for the data transmission, where several such agents are included in the interface zone. The GCM may thus allow for load sharing between the transfer agents, allowing agents that can handle the transmissions to appropriately loaded, avoiding overtaxing of individual agents across the network. The particular organization to which the external client belongs may also be referred to in this process of selection of transfer agents. The GCM may favor certain transfer agents for particular organizations, and if such transfer agents are busy at the time the organizations request transfers, the request may be placed in a transfer request queue as summarized below.

In selecting the bandwidth of a particular requested transfer, the GCM maintains a fixed lower and a variable upper threshold transfer rate. In a presently contemplated embodiment, the GCM allows a transfer to begin only if at least the minimum threshold is available in the network, and will otherwise place the transfer request in a queue. The transmission rate is maintained at a fixed value because the minimum of that value is needed to sustain the file transfer in view of network delays in the shared bandwidth. The upper threshold is a variable factor because it is dependent upon the available network bandwidth, with approximately 80% of the network bandwidth being the maximum achievable rate in a currently contemplated embodiment. The maximum transfer rate, then, that any client can achieve is variable between the upper and lower rates of the system. In a presently contemplated embodiment, the GCM always tries to achieve approximately 80% of the transfer rate requested by the client system. The selected information, the target pathway information, and the bandwidth and transfer rate information are all logged by the GCM as indicated by step 70.

At step 72, the GCM determines whether there is currently available bandwidth for the transmission. If there is available bandwidth for the transmission, the transmission may begin immediately as indicated at step 74. When an external client initiates the file transfer, the file content is transferred to the interface zone through an agent selected by the GCM. This agent then retransmits the file content to the internal client that is the target destination specified by the external client. This process is essentially transparent to the external client. The external client is connected to the internal network via the interface zone that in turn opens the connection to the internal client for uploading or downloading of content. The direct connection of the external client system to the internal network is restricted at all times. It should be noted that if an internal client moves out of the network and has to upload content from the external network, the information on this internal client is updated in the GCM and the internal client is treated as an external client, transferring content through the interface zone as would any other external client. The transmission and data relating to the transmission performed at step 74 is logged as indicated at step 76.

Figures 7, 8:
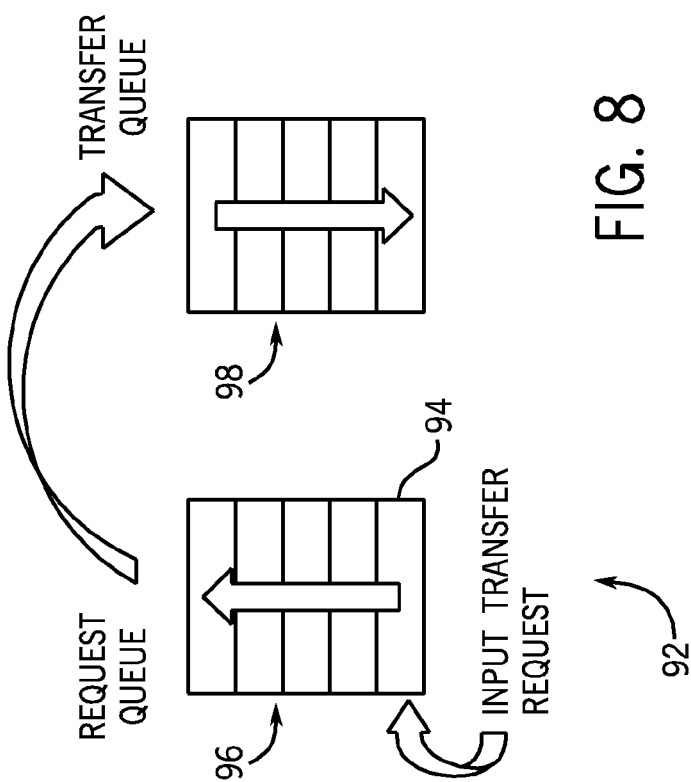
FIG. 7 is a diagram of an exemplary content transfer log established by the process of FIG. 6.
FIG. 8 is a diagrammatical view of request and transfer queues established by a gateway connection manager in carrying out the logic of FIG. 6.

FIG. 7 illustrates an exemplary content transfer log 90 that is maintained by the GCM for all requested and actual transfers. In the illustrated embodiment, this log may include the client system name, the system IP address, the system physical address, and the client job organization. The log may also include the client requested transfer rate and the client system bandwidth. Again, these parameters may be used to determine the transfer rate and bandwidth allocated to the external client transfer by the GCM. The log may also include the transfer agent used by the GCM. Once the transmission is complete, as summarized below, the log may also include the average transfer rate, the actual transfer time required, the actual transfer start time and the transfer duration. This information may be used for analysis purposes as well as to establish particular transfer paths for future transmissions of similar file data from the same external client or job organizations. This transfer target path may also be noted in the transfer log, along with an indication of the priority given to the transfer and an indication of whether the transfer was successful or encountered a problem or error.

Returning to FIG. 6, if at step 72 the bandwidth available in the interface zone is insufficient to initiate immediate transfer, the logic may proceed to a step 78 where a transfer request queue is established. The transfer request queue serves to allow transfer request to be accepted and all necessary data and selections to be made by the GCM, but the actual transfer to be delayed until the necessary bandwidth is available for the transmission. Moreover, reprioritization of queued transmissions may be made as indicated at step 80. That is, certain transmissions may be moved up in priority based, for example, upon the job organization, the type of transmission, the target of the transmission, and so forth. Such reprioritization may be made automatically or by human intervention at the GCM. If no special prioritization is to be made, the transmission is simply placed in the queue in the order received. However, if special prioritization is to be made, the queue may be adjusted as indicated at step 82. As available bandwidth is freed, then, the transfers are removed from the queue the actual transfers may begin.

FIG. 8 illustrates an exemplary queuing technique in accordance with a presently contemplated embodiment. The transfer scheme follows a first-in, first-out queuing order as indicated generally by reference numeral 92. New transfer requests are placed in the queue as indicated by reference numeral 94 and progress up the transfer request queue 96 until there is available bandwidth for the next transfer in the queue to be sent. Thereafter, there are moved to the transfer queue 98 and transfers begin as discussed above with reference to step 74 in FIG. 6.

Once the transmission of the data file has begun at step 74 in FIG. 6, the transfer is either successful or some error may occur. This evaluation may be performed as indicated at step 84, and if an error or failure occurs this is logged as indicated at step 86. If no failure or error has occurred, the success of the transfer is logged at step 88. In general, under no conditions will a task be discontinued by the GCM. An exception to this rule is when a client system decides to interrupt a connection. When such interruption occurs, the GCM records the connection attempt. Any other errors that may be detected in the transmission will be similarly recorded in the log.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A data communications control method comprising:
receiving a request to transfer a communication, such request communicated by an external client to a gateway connection manager in an interface zone between the external client and an internal network;
assigning a transfer rate for the communication;
assigning a transfer agent to receive the communication; and
receiving the communication in the interface zone if available bandwidth is sufficient for a minimum threshold transfer rate; and
transmitting the communication to the internal network.

2. The method of claim 1, wherein the transfer rate is assigned based upon available bandwidth in the interface zone.

3. The method of claim 2, wherein the transfer rate is assigned based upon a transfer rate requested by the external client.

4. The method of claim 1, wherein the gateway connection manager is configured to balance transfers through a plurality of transfer agents based upon availability.

5. The method of claim 1, wherein the transfer agent is assigned based upon a target path to an intended destination within the internal network.

6. The method of claim 1, comprising logging the request, the transfer rate and the transfer agent by the gateway connection manager.

7. The method of claim 1, comprising placing the communication in a transfer request queue based upon available bandwidth in the interface zone.

8. The method of claim 7, wherein requests are prioritized in the transfer request queue in a first-in, first-out basis.

9. The method of claim 1, comprising changing a priority for transfer of the communication with respect to other requests to transfer communications.

10. The method of claim 9, wherein the priority is changed based upon a characteristic of the requesting external client.

11. The method of claim 1, wherein the minimum threshold transfer rate is based on the transfer rate.

12. The method of claim 1, comprising assigning the request to a request queue if available bandwidth is insufficient for the minimum threshold transfer rate.

13. A data communications control method comprising:
receiving requests to transfer communications, such requests communicated by a plurality of external clients to gateway connection managers in interface zones between the external clients and an internal network;
assigning, by each of the gateway connection managers, a transfer rate for each of the communications;
assigning a transfer agent in each of the interface zones to receive respective communications;
receiving the communications in the interface zones if available bandwidth is sufficient for a minimum threshold transfer rate for each of the communications; and
transmitting each of the communications to the internal network;
logging data for the communications by each of the gateway connection managers; and
sharing the logged data between the gateway connection managers.

14. The method of claim 13, wherein the gateway connection manager receiving a request is specified by the requesting external client.

15. The method of claim 14, wherein the transfer rate for each communication is assigned based upon a transfer rate requested by the respective external client.

16. The method of claim 13, wherein logged data is shared by storing the logged data in a shared memory space.

17. The method of claim 13, wherein the logged data is shared by synchronizing logs maintained by each of the gateway connection managers.

18. The method of claim 13, wherein the transfer rate for each communication is assigned based upon available bandwidth in the respective interface zone.

19. The method of claim 13, wherein each gateway connection manager is configured to balance transfers through a plurality of transfer agents based upon availability.

20. The method of claim 13, comprising placing communications in a transfer request queue based upon available bandwidth in the respective interface zone.

21. The method of claim 20, wherein requests are prioritized in the transfer request queue in a first-in, first-out basis.

22. The method of claim 20, comprising changing a priority for transfer of the communications with respect to other communications.

23. The method of claim 22, wherein the priority is changed based upon a characteristic of the requesting external client.

24. The method of claim 13, wherein the minimum threshold transfer rate is based on the transfer rate for each of the communications.

25. The method of claim 13, comprising assigning each of the requests to a request queue if available bandwidth is insufficient for the minimum threshold transfer rate.

* * * * *